(12) United States Patent
Schuster et al.

(10) Patent No.: US 7,150,242 B2
(45) Date of Patent: Dec. 19, 2006

(54) ANIMAL LITTER BOX

(76) Inventors: Harold Schuster, 20115-107 Avenue N.W., Edmonton, Alberta (CA) T5S 1W4; Roberta June Schuster, 20115-107 Avenue N.W., Edmonton, Alberta (CA) T5S 1W4

( * ) Notice: Subject to any disclaimer, the term of this patent is extended or adjusted under 35 U.S.C. 154(b) by 0 days.

(21) Appl. No.: 10/901,270

(22) Filed: Jul. 28, 2004

(65) Prior Publication Data

US 2006/0032452 A1 Feb. 16, 2006

(51) Int. Cl.
*A01K 29/00* (2006.01)

(52) U.S. Cl. .................................................. 119/165

(58) Field of Classification Search ............... 119/165, 119/161, 162, 163, 164, 166, 167, 168, 169, 119/170; D30/161, 108, 118
See application file for complete search history.

(56) References Cited

U.S. PATENT DOCUMENTS

| | | | | |
|---|---|---|---|---|
| 2,741,223 A | | 4/1956 | Winborn, Jr. | |
| 3,310,031 A | * | 3/1967 | Lowe, Jr. ................... | 119/165 |
| D218,446 S | * | 8/1970 | Sleith ........................ | D30/161 |
| 3,734,341 A | * | 5/1973 | Levenhagen ................ | 206/507 |
| 3,990,397 A | * | 11/1976 | Lowe, Jr. ................... | 119/165 |
| 4,271,544 A | | 6/1981 | Hammond | |
| 4,766,845 A | * | 8/1988 | Bavas ........................ | 119/165 |
| 5,590,623 A | * | 1/1997 | Toole et al. ................ | 119/165 |
| D380,880 S | * | 7/1997 | Reid .......................... | D30/161 |
| 5,701,845 A | * | 12/1997 | Jablonski et al. ........... | 119/166 |
| 5,785,000 A | * | 7/1998 | Barbary ..................... | 119/166 |
| D425,275 S | * | 5/2000 | Delouvre et al. ........... | D32/37 |
| D448,567 S | * | 10/2001 | Buss .......................... | D3/310 |
| 6,354,243 B1 | * | 3/2002 | Lewis et al. ................ | 119/165 |
| D512,542 S | * | 12/2005 | Northrop et al. ........... | D30/161 |
| 2003/0188690 A1 | | 10/2003 | Zabik | |

* cited by examiner

*Primary Examiner*—Teri Pham Luu
*Assistant Examiner*—Joshua Michener
(74) *Attorney, Agent, or Firm*—Terrence N. Kuharchuk; Rodman & Rodman (57) ABSTRACT

An animal litter box which is configured to urge an animal toward a desired orientation in the litter box. The litter box includes a floor, a sidewall extending upward from the floor to define an interior of the litter box, which sidewall has an interior sidewall surface facing the interior of the litter box, and a cue associated with a selected portion of the interior sidewall surface, which cue urges the animal toward the desired orientation.

25 Claims, 9 Drawing Sheets

ANIMAL LITTER BOX

TECHNICAL FIELD

An animal litter box which is configured to urge an animal toward a desired orientation in the litter box.

BACKGROUND OF THE INVENTION

Litter boxes are commonly used to provide animals such as cats, small dogs, ferrets etc. with a relatively sanitary and secure location to urinate and defecate.

A typical litter box includes a floor surrounded by a sidewall. In use, the floor of a litter box is typically covered with a layer of litter. The litter is intended to absorb moisture and suppress odour.

At a minimum, the height of the sidewall must be sufficient to contain the layer of litter which covers the floor. Preferably, however, the height of the sidewall is also sufficient to contain litter which may be stirred up by the animal during use of the litter box and urine which may be sprayed by the animal during use of the litter box. As a result, the height of the sidewall of a litter box may vary.

A litter box may also include a cover so that the litter box is enclosed. Depending upon the height of the sidewall and upon whether the litter box includes a cover, the litter box may or may not include an entrance gap to facilitate ingress to and egress from the litter box.

Litter box covers tend not to be fully satisfactory for containing litter and urine. In many cases, litter and especially urine may infiltrate the joint between the litter box and the cover, causing leakage from the litter box. In addition, some animals exhibit an aversion to using a litter box which includes a cover.

As a result, a relatively high sidewall is potentially more effective than a litter box cover for containing litter and urine within the litter box. A relatively high sidewall, however, typically requires that the litter box be equipped with an entrance gap in the sidewall. Unfortunately, the entrance gap constitutes an avenue for litter and urine to exit the litter box. It can therefore be very difficult to maintain cleanliness and hygiene outside of the litter box in the vicinity of the entrance gap, which is a problem associated with the use of litter boxes having entrance gaps.

The entrance gap problem may be exacerbated by a tendency of an animal to walk into the litter box headfirst through the entrance gap and then to use the litter box without turning around. The problem also appears to be more noticeable in the case of elderly animals, particularly elderly cats, who sometimes exhibit a tendency to spray urine upward, often through the entrance gap.

The entrance gap problem could be reduced or eliminated if an animal using the litter box could be urged to be oriented so that full advantage could be taken of the relatively high sidewall in order to contain litter and urine. In other words, if the animal can be pointed in an appropriate direction within the litter box, litter and urine will tend to be thrown or sprayed against the sidewall and not in the direction of the entrance gap.

There may be other reasons for wishing to position an animal in a desired orientation in the litter box. As one example, it may be desirable to keep certain areas of the floor of the litter box relatively clean (such as the area in front of an entrance gap) so that dirty litter and animal waste does not become lodged in the animal's paws and become tracked throughout the environment outside of the litter box.

As another example, the litter box may be designed so that a certain area of the litter box is designated for the deposition of animal waste. Examples of such litter boxes are found in U.S. Pat. No. 2,741,223 (Winborn), U.S. Pat. No. 3,990,397 (Lowe) and U.S. Pat. No. 4,271,544 (Hammond). In these circumstances, it may be desirable to urge the animal toward a desired orientation which will position the animal over the designated area.

As a result, there is a need for an animal litter box which is configured to urge an animal toward a desired orientation in the litter box.

SUMMARY OF THE INVENTION

The present invention relates to an animal litter box which is configured to urge an animal toward a desired orientation in the litter box.

The litter box is "configured" to urge the animal toward the desired orientation by providing the litter box with one or more "cues" which are associated with the litter box and which are selected and configured to urge the animal toward the desired orientation.

A cue may urge the animal toward the desired orientation either by attracting the animal to the cue or by repelling the animal from the cue.

A cue may be associated with the litter box in any suitable manner. Preferably the cue is associated with an interior of the litter box so that the cue is perceptible by the animal from within the litter box.

In a preferred aspect, the invention is an animal litter box comprising:
(a) a floor;
(b) a sidewall extending upward from the floor, the sidewall surrounding an interior of the litter box, the sidewall having an interior sidewall surface facing the interior of the litter box; and
(c) a cue associated with a selected portion of the interior sidewall surface, for urging an animal toward a desired orientation in the litter box.

The cue may be comprised of any stimulus which is effective to influence the animal, including a visually perceptible cue such as a light, a non-visually perceptible cue such as heat or a sensation of warmth, a cue which is perceptible by touch, a cue which is perceptible by smell, an audible cue, some other form of sensory cue or a combination of such cues.

For example, the cue may be comprised of a visually perceptible irregularity or may be comprised of a discontinuity in the selected portion of the interior sidewall surface. The cue may also be comprised of a combination of visually perceptible irregularities and discontinuities.

A visually perceptible irregularity is visually discernible relative to the interior sidewall surface as an "irregularity" in the interior sidewall surface. A visually perceptible irregularity may be substantially flat and flush with the interior sidewall surface or may be three-dimensional.

A discontinuity may be visually discernible relative to the interior sidewall surface, but also provides a three-dimensional disruption in the interior sidewall surface.

Non-limiting examples of visually perceptible irregularities include a shape, a pattern, a colour or even a mirror associated with the selected portion of the interior sidewall surface. A visually perceptible irregularity may serve either to attract the animal or to repel the animal from the irregularity.

Non-limiting examples of discontinuities include a protrusion or a recess in the selected portion of the interior sidewall surface or a surface texture of the selected portion of the interior sidewall surface. A protrusion or recess may serve to alter the spatial perception of the animal with respect to the size of the litter box in the vicinity of the discontinuity. In particular, a protrusion may create an impression in the mind of the animal of relative confinement and crowding while a recess may create an impression in the mind of the animal of relative spaciousness. A surface texture may serve either to attract the animal or to repel the animal from the surface texture.

In preferred embodiments the cue is comprised of a discontinuity in the selected portion of the interior sidewall surface. In a particular preferred embodiment the cue is comprised of a protrusion which extends laterally a protrusion distance toward the interior of the litter box. The protrusion represents a constriction or narrowing in the dimensions of the interior of the litter box which may cause the animal to position itself within the litter box so as to avoid the protrusion.

The sidewall has an upper end and a lower end. The lower end of the sidewall is typically connected with the floor of the litter box and defines a lower end of the litter box. The upper end of the sidewall defines an upper end of the litter box. A rim may extend laterally from the upper end of the sidewall in order to add strength and rigidity to the sidewall.

The protrusion may be any size or shape within the selected portion of the interior sidewall surface. The protrusion may extend for all or a portion of the distance between the upper end and the lower end of the sidewall. The protrusion may be a uniform shape and/or size or the shape and/or size of the protrusion may vary either horizontally or vertically.

The protrusion has a lower protrusion end and an upper protrusion end. Preferably the protrusion is positioned so that it generally or substantially coincides with eye level for the animal which is intended to use the litter box. Preferably the protrusion is configured so that the protrusion distance varies in order to provide a relatively smooth shape and contour of the protrusion both horizontally and vertically.

In a preferred embodiment the lower protrusion end is above the lower end of the sidewall and the upper protrusion end is adjacent to the upper end of the sidewall. Furthermore, in the preferred embodiment the protrusion distance at the lower protrusion end is less than the protrusion distance at the upper protrusion end so that the protrusion is tapered between the upper protrusion end and the lower protrusion end. This configuration minimizes the extent to which the protrusion will interfere with the cleaning of the floor of the litter box. In the preferred embodiment the greatest protrusion distance generally or substantially coincides with eye level for the animal which is intended to use the litter box.

The sidewall and thus the litter box may be any shape. For example the sidewall may be curved, may be made up of straight sides, or may include both curves and straight sides. The sidewall may be generally circular, oval or polygonal. Preferably the sidewall is generally polygonal.

The configuration of a cue will depend upon whether the particular cue is intended to attract or repel the animal and will also depend upon the desired orientation of the animal within the litter box. If the objective is to prevent the throwing of litter or the spraying of urine in a particular direction, a cue should be selected and configured so as to urge the animal to position itself within the litter box in a direction which avoids the particular direction.

For example, the "front" of the litter box may be considered as the section of the litter box which serves as the point of ingress to and egress from the litter box by the animal. In one typical application of the invention, the objective may be to prevent the throwing of litter or the spraying of urine in a direction toward the front of the litter box. As a result, a cue may be selected and configured so that the animal is urged toward an orientation in which a rear end of the animal does not face the front of the litter box. A cue may therefore in such circumstances be selected and configured to repel the animal from an orientation in which its rear end faces the front of the litter box or may be selected and configured to attract the animal to an orientation in which its rear end does not face the front of the litter box.

The sidewall is preferably comprised of a front wall at the front of the litter box and an opposing back wall at the back of the litter box. In a preferred embodiment the sidewall is preferably generally trapezoidal, so that the back wall and the front wall are substantially parallel but have different lengths. This configuration provides a secondary stimulus for the animal based upon the shape of the litter box, since the portion of the interior of the litter box adjacent to the longer wall will be relatively more spacious than the portion of the interior of the litter box adjacent to the shorter wall. This secondary stimulus may serve to urge the animal to align itself along a line which is parallel with the front and back walls. Preferably the length of the back wall is greater than the length of the front wall so that the animal is urged toward the back of the litter box.

In a preferred embodiment the sidewall is further comprised of a left side wall and a right side wall, both of which extend between the front wall and the back wall. A left front corner of the sidewall is provided between the left side wall and the front wall and a right front corner of the sidewall is provided between the right side wall and the front wall.

In the preferred embodiment, the left front corner and the right front corner are both curved or angled so that they provide oblique corners. The use of oblique corners at the front corners of the litter box enables the litter box to be placed in relative close proximity to an inward opening door while still permitting opening of the door. This feature is enhanced by providing the sidewall with a trapezoidal shape in which the length of the back wall is greater than the length of the front wall.

As indicated above, it may be a generally desirable objective to prevent the throwing of litter or the spraying of urine in a direction toward the front wall of the litter box. Where the litter box is provided with an entrance gap in the sidewall at the front of the litter box, a more particular objective may be to prevent the throwing of litter or the spraying of urine in a direction toward the entrance gap.

In a preferred embodiment the litter box is provided with a relatively high sidewall in order to effectively contain litter and urine. As a result, in the preferred embodiment the litter box is provided with an entrance gap in the front wall to facilitate ingress to and egress from the litter box by the animal.

A typical sidewall in a conventional litter box has a height of less than about five inches. As a result, a relatively high sidewall according to the present invention may have a height which exceeds about five inches. Preferably the relatively high sidewall in the preferred embodiment of the litter box has a height of between about six inches and twelve inches.

The entrance gap may extend vertically for any portion of the height of the sidewall of the litter box. Preferably the entrance gap extends vertically from a lower gap end which is above the lower end of the sidewall. The entrance gap may terminate below the upper end of the sidewall so that the sidewall defines an aperture comprising the entrance gap.

Preferably, however the entrance gap extends to the upper end of the sidewall so that the entrance gap coincides with a gap in the upper end of the sidewall.

A cue may be associated with any portion of the sidewall which will facilitate urging of the animal toward the desired orientation. In preferred embodiments the desired orientation is an orientation in which the rear end of the animal does not face the entrance gap in the front wall of the litter box. The particular location of the cue relative to the sidewall will depend upon the desired orientation and upon whether the cue is intended to attract or repel the animal.

If the cue is comprised of a protrusion, the protrusion will tend to repel the animal from an orientation in which the animal is aligned with the protrusion. As a result, if the cue is comprised of a protrusion the back wall of the sidewall is preferably comprised of the selected portion of the interior sidewall surface.

Any portion of the back wall may be comprised of the selected portion of the interior sidewall surface. Preferably, however, the selected portion of the interior sidewall surface is aligned with the entrance gap such that the selected portion of the interior sidewall surface is substantially opposite to the entrance gap. By aligning the protrusion with the entrance gap and because the animal will seek not to align itself with the protrusion, the animal will be urged not to be aligned with the entrance gap.

If the cue is comprised of a recess in the interior sidewall surface, the cue may alternatively be located in the left side wall or the right side wall, since the animal may be urged to align itself with the recess in order to enjoy a more spacious orientation in the litter box.

Other types of cues may be located in various positions relative to the sidewall, depending upon the effect of the cue on the animal and depending upon the desired orientation of the animal within the litter box.

BRIEF DESCRIPTION OF DRAWINGS

Embodiments of the invention will now be described with reference to the accompanying drawings, in which.

DETAILED DESCRIPTION

The present invention relates to an animal litter box which is configured to urge an animal toward a desired orientation in the litter box.

Referring to FIGS. 1–5, a preferred embodiment of the litter box (20) includes a floor (22) and a sidewall (24). The litter box (20) may optionally include a litter box cover (not shown).

In the preferred embodiment the litter box (20) is sized and designed for use with cats, but the litter box may be used or adapted for use with other animals.

The sidewall (24) extends upward from the floor (22). The sidewall (24) has a lower end (26) which is connected with the floor (22) and has an upper end (28) which defines an upper end (30) of the litter box (20). The sidewall (24) surrounds an interior (32) of the litter box (20) and has an interior sidewall surface (34) which faces the interior (32) of the litter box (20).

The sidewall (24) preferably has a height which is relatively high in comparison with some conventional litter boxes. In the preferred embodiment the height of the sidewall (24) is between about six inches and about twelve inches. In particular, in the preferred embodiment the height of the sidewall (24) is between about ten inches and about twelve inches.

The sidewall (24) slopes outward slightly along its height from the lower end (26) to the upper end (28) so that the interior (32) of the litter box (20) has a slightly smaller area near the floor (22) of the litter box (20) than near the upper end (30) of the litter box (20).

In the preferred embodiment the sidewall (24) is comprised of a front wall (36) and an opposing back wall (38). The front wall (36) and the back wall (38) are substantially parallel, but the back wall (38) has a greater length than the front wall (36).

In the preferred embodiment the sidewall (24) is further comprised of a left side wall (40) and a right side wall (42). The left side wall (40) and the right side wall (42) have substantially equal lengths but are not parallel.

Figure 2:
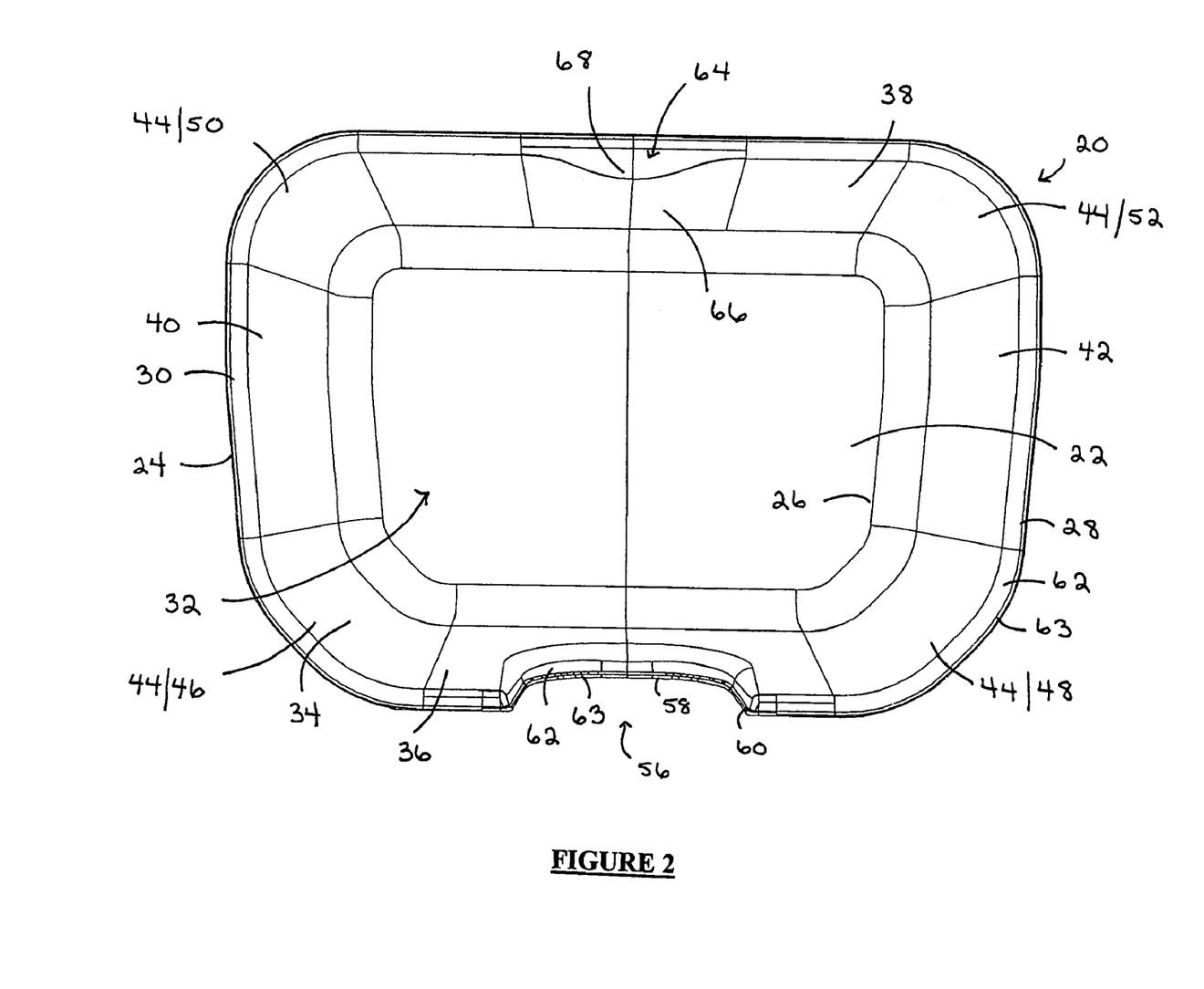
FIG. 2 is a top plan view of the litter box depicted in FIG. 1.
Figure 3:
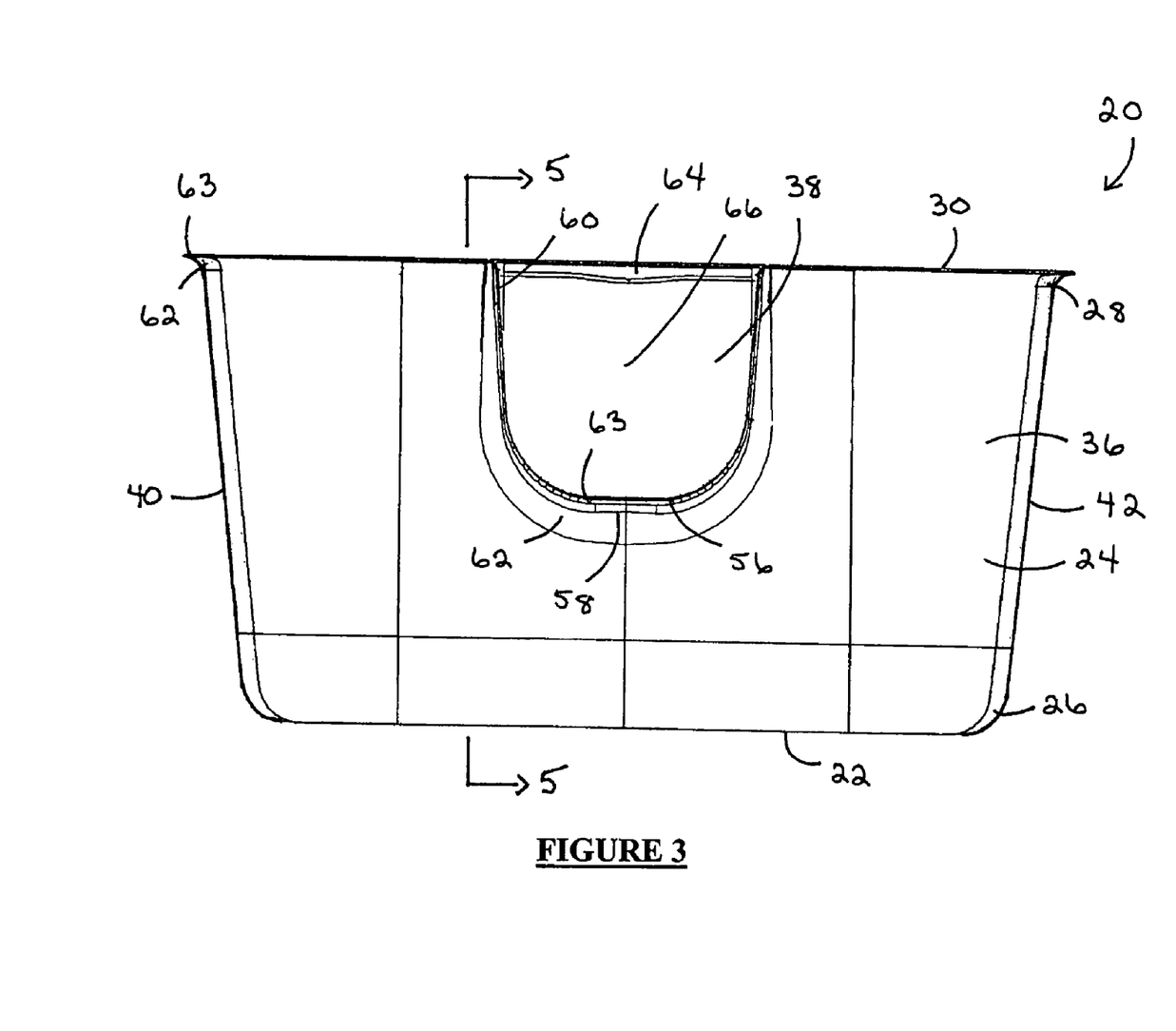
FIG. 3 is a front elevation view of the litter box depicted in FIG. 1.
Figure 4:
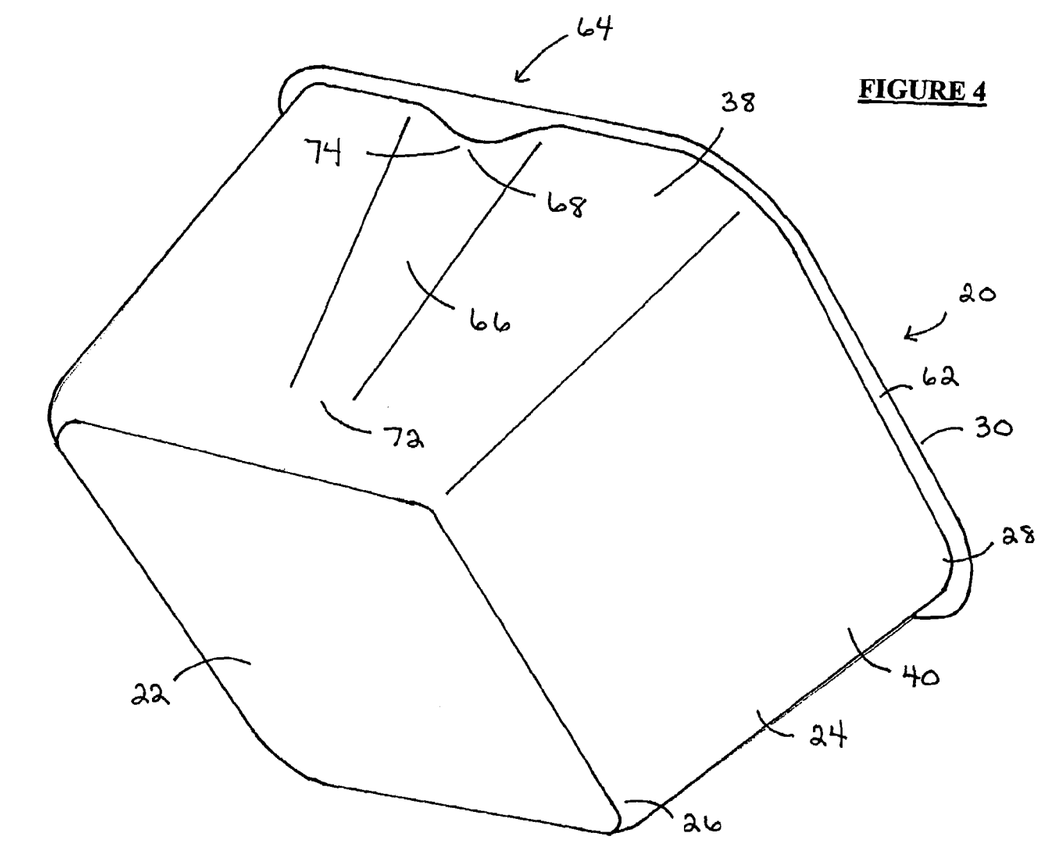
FIG. 4 is a back perspective view of the litter box depicted in FIG. 1.

As a result, in the preferred embodiment the litter box (20) in plan view has a generally trapezoidal shape, with the larger portion of the trapezoid being adjacent to the back wall (38) of the litter box (20).

In the preferred embodiment, the sidewall (24) is further comprised of sidewall corners (44), including a left front corner (46), a right front corner (48), a left rear corner (50) and a right rear corner (52). The sidewall corners (44) are oblique corners and in the preferred embodiment are radiused to provide a smooth transition between the corners (44) and their adjacent walls (36,38,40,42).

Referring to FIG. 2, the combination of the trapezoidal shape of the litter box (20) and the oblique shape of the sidewall corners (44) enables the litter box (20) to be placed in relative close proximity to an inward opening door (not shown) while still permitting the door to be opened sufficiently to permit reasonable passage therethrough.

As indicated, in the preferred embodiment the litter box (20) is sized for use with cats. As a result, in the preferred embodiment the distance between the side walls (40,42) is between about twenty inches and twenty four inches wide at the widest part of the litter box (20) and the distance between the front wall (36) and the back wall (38) is between about fourteen inches and about sixteen inches.

The front wall (36) of the litter box (20) provides a point of ingress into the litter box (20) and a point of egress from the litter box (20) for an animal (not shown) using the litter box (20). Due to the relatively high sidewall (24), the front wall (36) defines an entrance gap (56) so that the animal can easily access the interior (32) of the litter box (20).

The entrance gap (56) is comprised of a generally rectangular gap with radiused corners which is formed in the front wall (36). The entrance gap (56) extends vertically from a lower gap end (58) which is located above the lower end (26) of the sidewall (24) to an upper gap end (60) at the upper end (28) of the sidewall (24) so that the entrance gap (56) provides a gap in the upper end (28) of the sidewall (24).

The entrance gap (56) is wide enough to permit the passage of the animal easily therethrough. In the preferred embodiment the width of the entrance gap (56) is between about five inches and about seven inches. The lower gap end (58) of the entrance gap (56) is low enough so that the animal can enter and exit the litter box (20) with ease, but high enough so that litter (not shown) covering the floor of the litter box (20) can be contained within the litter box (20). In the preferred embodiment the distance between the lower end (26) of the sidewall (24) and the lower gap end (58) is between about three inches and about six inches, or more particularly between about four inches and about five inches.

Figure 1:
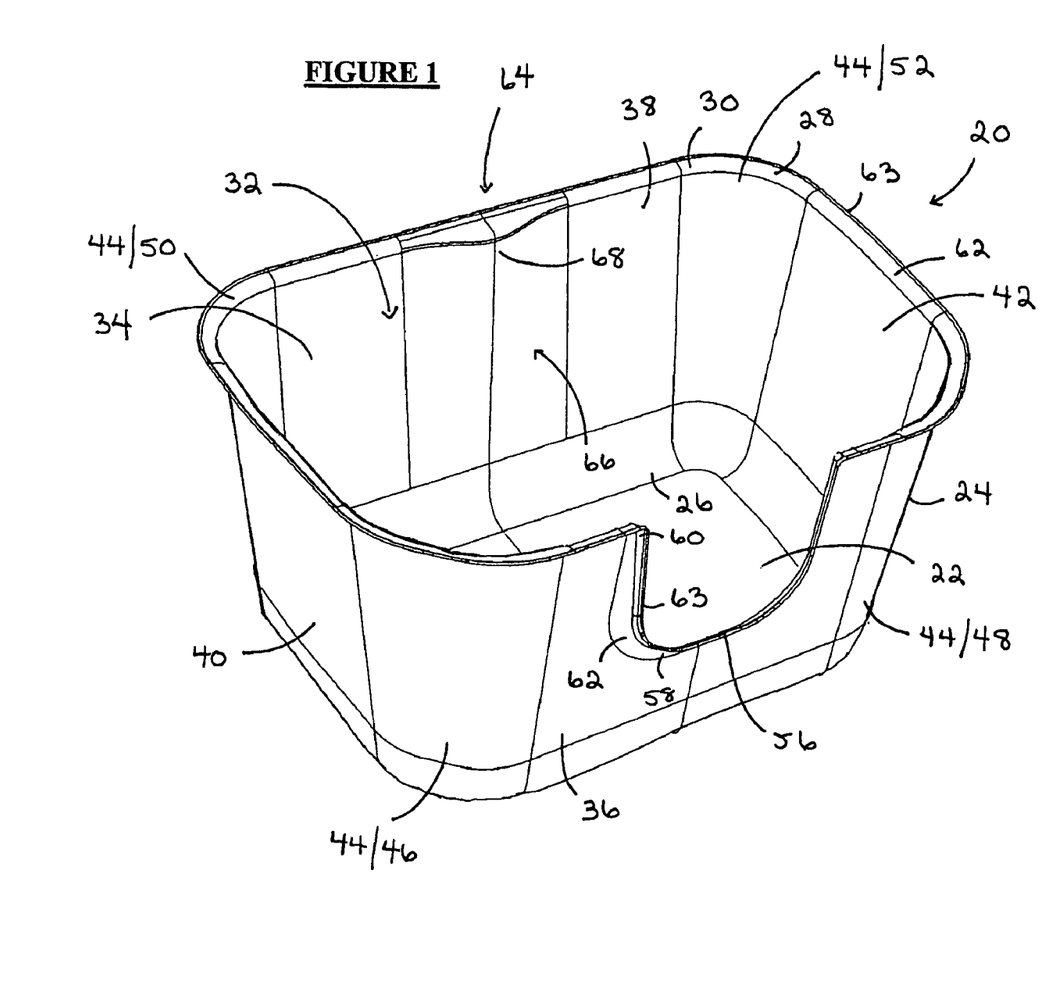
FIG. 1 is a perspective view of a preferred embodiment of an animal litter box according to the invention, including a protrusion associated with the back wall of the litter box as a cue.

Referring to FIG. 1, in the preferred embodiment the upper end (28) of the sidewall (24) is provided with a rim (62) which projects laterally from the upper end (28) of the sidewall (24) and preferably in a slightly upwards direction. The rim (62) also projects laterally from the entrance gap (56), and preferably in a slightly upwards direction, so that the rim (62) is continuous around the entire perimeter of the litter box (20). The rim (62) adds strength and rigidity to the litter box (20). In addition, the rim (62), including the upward direction of the rim (62) as it projects laterally from the upper end (28) of the sidewall (24), assists with retaining urine and litter in the litter box (20) during use. In FIG. 1, the rim (62) is depicted as extending laterally away from the interior (32) of the litter box (20). Alternatively the rim (62) may extend laterally toward the interior (32) of the litter box (20) so that the rim (62) can further assist in containing urine and litter within the litter box (20), particularly if litter is thrown upwards by the animal during use of the litter box (20).

Finally, the rim (62) preferably includes a bead (63) or raised ridge thereon which adds strength and rigidity to the rim (62) and further assists with retaining urine and litter in the litter box (20) during use. Preferably, the bead (63) is continuous with the rim (62) and extends around the entire perimeter of the litter box (20), including the entrance gap (56).

The litter box (20) comprises at least one cue (64) which is associated with the litter box (20), which cue (64) is selected and configured to urge the animal toward a desired orientation in the litter box (20).

In the preferred embodiment the desired orientation is an orientation in which litter is less likely to be thrown by the animal toward the entrance gap (56) and in which urine is less likely to be sprayed by the animal toward the entrance gap (56).

In the preferred embodiment the cue (64) is associated with a selected portion (66) of the interior sidewall surface (34) so that the cue (64) acts as a stimulus for the animal when the animal is within the litter box (20).

The cue (64) may serve to attract the animal toward the cue (64) or to repel the animal from the cue (64).

In preferred embodiments the cue (64) is comprised of a visually perceptible irregularity associated with the selected portion (66) of the interior sidewall surface (34) and/or a discontinuity in the selected portion (66) of the interior sidewall surface (34).

A visually perceptible irregularity is a cue (64) which is visually discernible by the animal. A visually perceptible irregularity may be flat or generally flush with the interior sidewall surface (34) or may be three-dimensional. A discontinuity is a cue (64) which may be visually discernible by the animal, but which also provides a three-dimensional disruption in the interior sidewall surface (34). A cue (64) comprising a discontinuity is advantageous where the animal has vision problems or where the litter box (20) is used at night or in the dark.

Referring to FIGS. 1–5, in a preferred embodiment the cue (64) is comprised of a discontinuity in the selected portion (66) of the interior sidewall surface (34). More particularly, the discontinuity is comprised of a protrusion (68) which extends laterally a protrusion distance (70) toward the interior (32) of the litter box (20).

As depicted in FIGS. 1–5, the protrusion (68) has a generally rounded shape in order to provide a smooth transition relative to the interior sidewall surface (34). Alternatively, the protrusion (68) may have a shape and features which provide a more abrupt contrast with the interior sidewall surface (34) so that it is easier for the animal to see and feel the cue (64). For example, the protrusion (68) may include abrupt corners and/or ridges.

In this preferred embodiment the back wall (38) is comprised of the selected portion (66) of the interior sidewall surface (34) so that the protrusion (68) is associated with the back wall (38). The placement of the protrusion (68) on the back wall (38) of the litter box (20) provides a constriction or narrowing between the front wall (36) and the back wall (38) which urges the animal to align itself along a line which is parallel to the front wall (36) and the back wall (38), in which alignment the animal is not aligned with the entrance gap (56).

Although the protrusion (68) may be placed at any position along the back wall (38) in order to create the constriction effect between the front wall (36) and the back wall (38), the selected portion (66) of the interior sidewall surface (34) is preferably aligned with the entrance gap (56) so that the protrusion (68) is substantially opposite to the entrance gap (56). In this configuration the animal encounters the protrusion (68) as it enters the litter box (20) and is urged to turn to the left or to the right.

Referring to FIGS. 1–5, the trapezoidal shape of the litter box (20) may provide a secondary stimulus for urging the animal to align itself along a line which is parallel to the front wall (36) and the back wall (38), since the wider portion of the litter box (20) constitutes an enlarged area which may be attractive to the animal.

Figure 6:
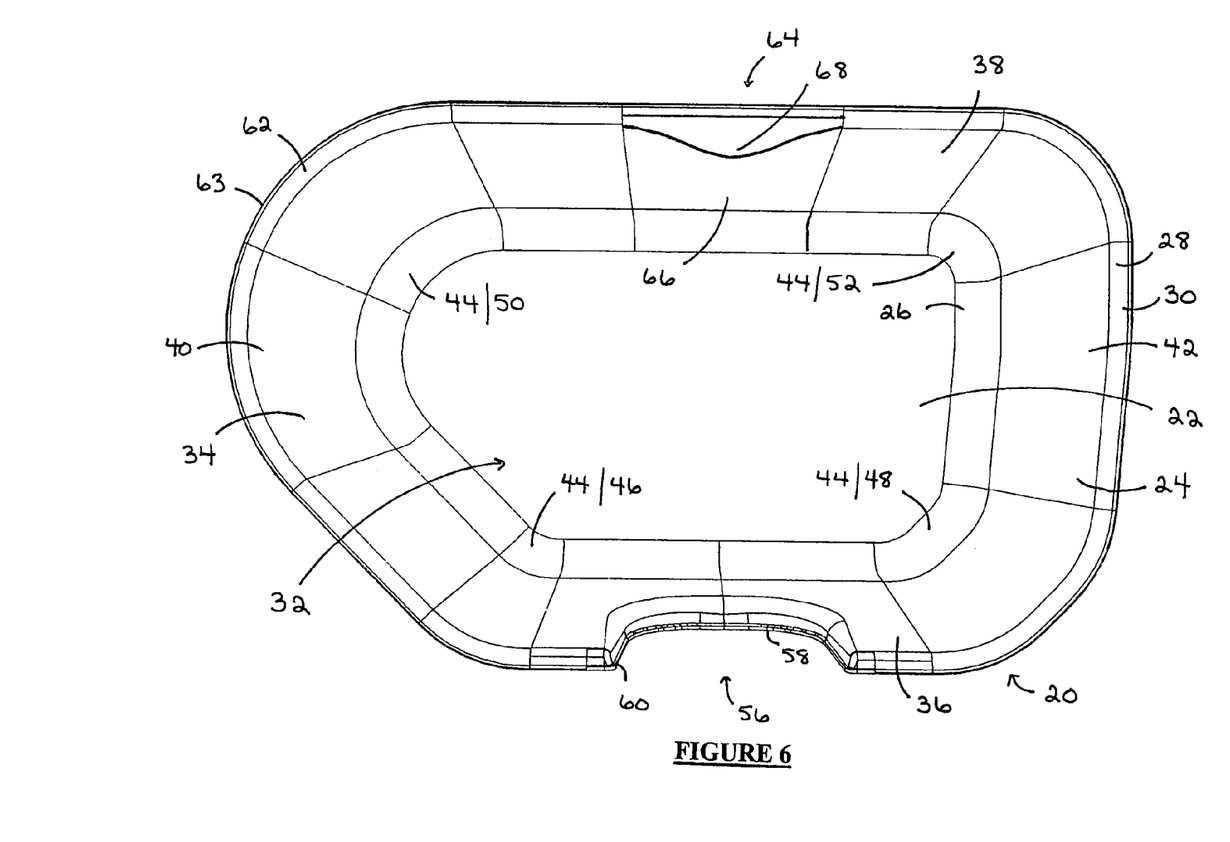
FIG. 6 is a top plan view of a first alternate embodiment of an animal litter box according to the invention, including the protrusion associated with the back wall of the litter box as the cue and showing a different shape of the walls of the litter box as a secondary stimulus.

FIG. 6 shows an alternate trapezoidal shape or configuration of the litter box (20) providing the secondary stimulus, while the protrusion (68), as described above, provides the cue (64). The alternate trapezoidal shape provides an enhanced widened portion of the litter box (20) which constitutes an increased enlarged area and thus may further urge the animal to align itself along a line which is parallel to the front and back walls (36, 38).

Figure 5:
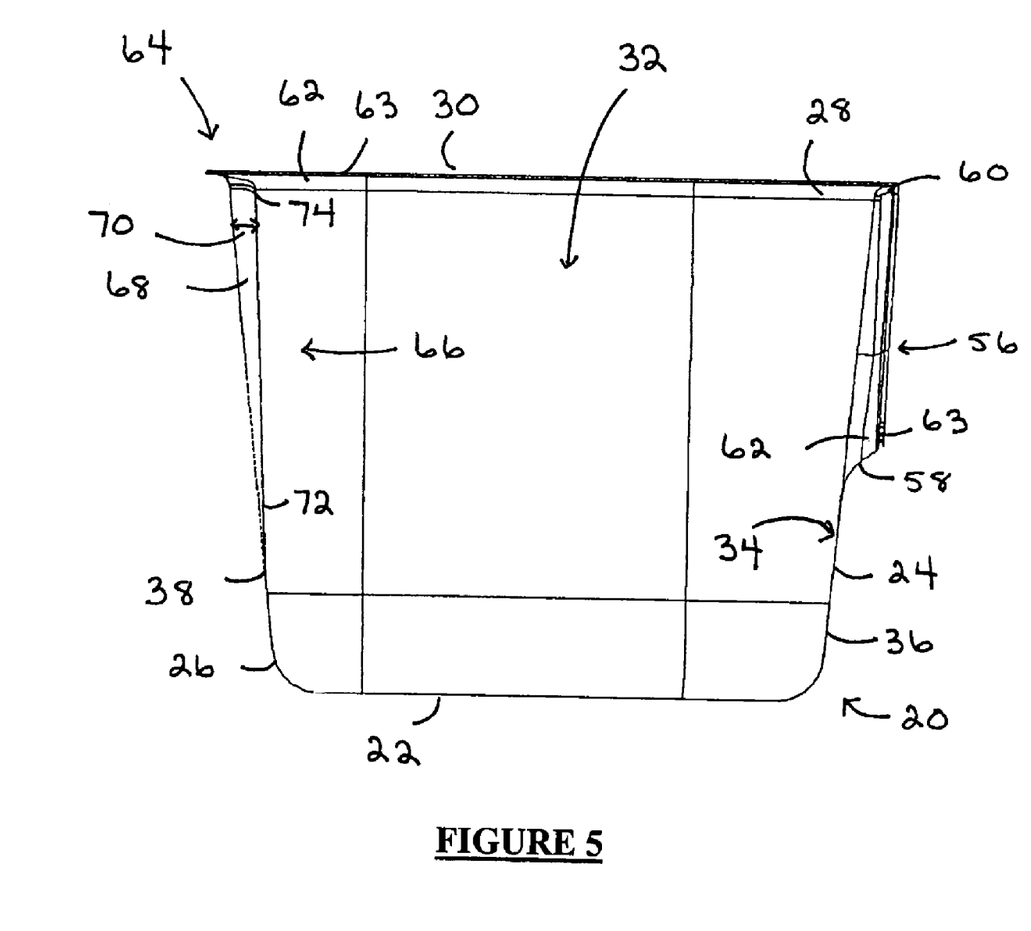
FIG. 5 is a sectional view of the litter box taken along lines 5—5 of FIG. 3.

Referring particularly to FIG. 5, the protrusion (68) preferably extends vertically from a lower protrusion end (72) which is above the lower end (26) of the sidewall (24) to an upper protrusion end (74) which is adjacent to the upper end (28) of the sidewall (24). This configuration minimizes interference by the protrusion (68) with the cleaning of the floor (22) of the litter box (20).

The vertical position of the protrusion (68) generally coincides with eye level for the animal so that the animal can sense the protrusion (68) as it enters the litter box (20).

The protrusion distance (70) varies from the upper protrusion end (74) to the lower protrusion end (72) so that the protrusion distance (70) at the lower protrusion end (72) is less than the protrusion distance (70) at the upper protrusion end (74). More particularly, the protrusion (68) is tapered between the upper protrusion end (74) and the lower protrusion end (72) to provide a smooth transition relative to the interior sidewall surface (34). The configuration of the tapering of the protrusion (68) is such that the greatest protrusion distance (70) generally coincides with eye level for the animal.

Figure 7:
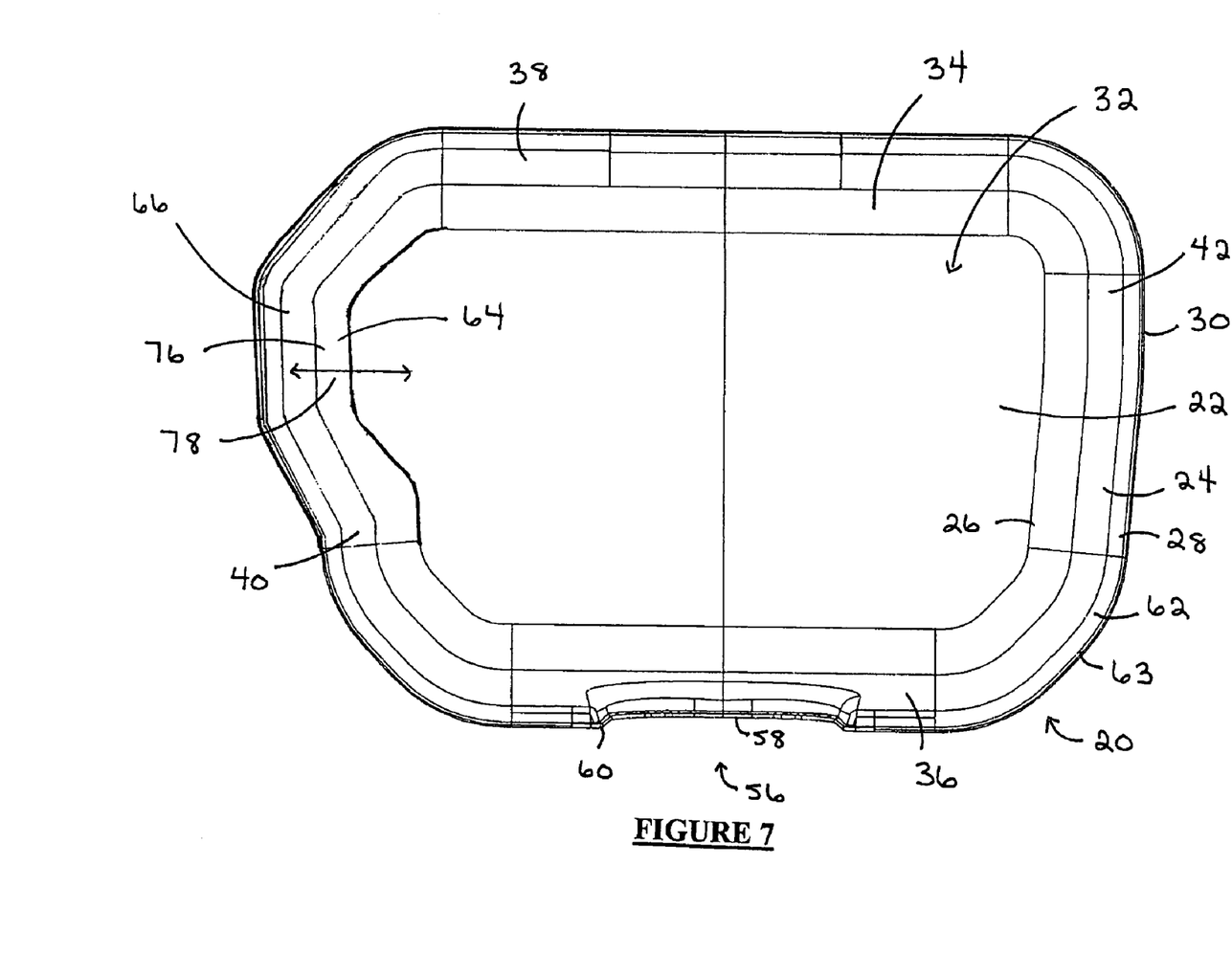
FIG. 7 is a top plan view of a second alternate embodiment of an animal litter box according to the invention, including a recess associated with the left side wall of the litter box as a cue.

Referring to FIG. 7, in a second alternate embodiment the cue (64) is comprised of a discontinuity in the selected portion (66) of the interior sidewall surface (34). More particularly, the discontinuity is comprised of a recess (76) which extends laterally a recess distance (78) away from the interior (32) of the litter box (20).

As depicted in FIG. 7, the recess (76) is associated with the left side wall (40). Alternatively, the recess (76) may be associated with the right side wall (42) or with both the left side wall (40) and the right side wall (42).

The considerations applicable to the shape and configuration of the protrusion depicted in FIGS. 1–6 apply equally to the shape and configuration of the recess (76) depicted in FIG. 7.

Figure 8:
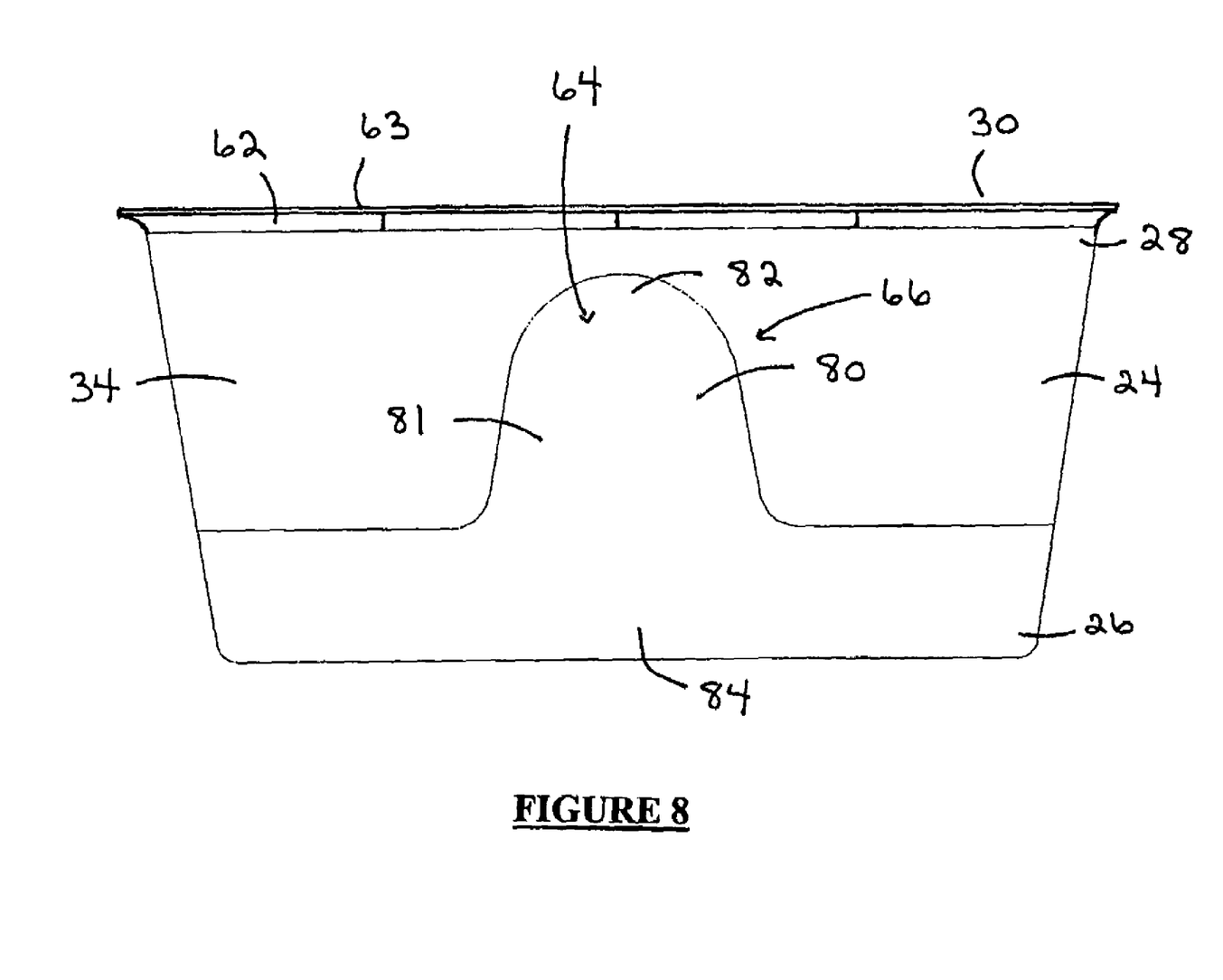
FIG. 8 is an elevation view of an interior sidewall surface of an animal litter box according to a third alternate embodiment of the invention, including a shape associated with the interior sidewall surface as a cue.

Referring to FIG. 8, in a third alternate embodiment the cue (64) is comprised of a visually perceptible irregularity associated with the selected portion (66) of the interior sidewall surface (34). More particularly the cue (68) is comprised of a two-dimensional shape (80) affixed to or formed in the interior sidewall surface (34).

As shown in FIG. 8, the two-dimensional shape (80) is preferably formed in the interior sidewall surface (34) and may be comprised of either a recessed or a raised portion (81) of the interior sidewall surface (34). The recessed or raised portion (81) preferably extends from an upper end (82), which is at, adjacent or in proximity to the upper end (28) of the sidewall (24), to a lower end (84). The lower end (84) of the recessed or raised portion (81) preferably extends to the lower end (26) of the sidewall (24) and across the entire width of the lower end (26), as shown in FIG. 8, in order to facilitate the cleaning of the floor (22) of the litter box (20).

Figure 9:
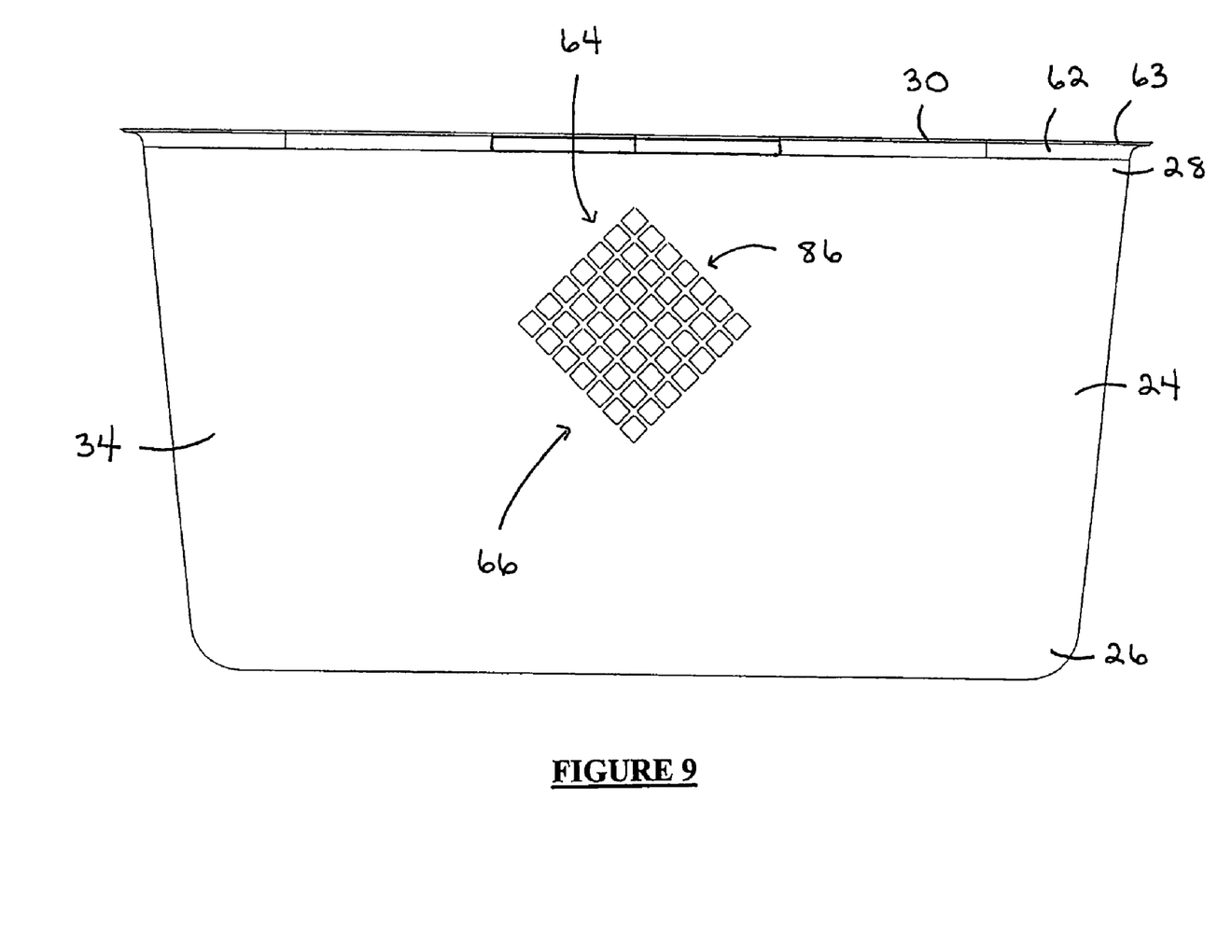
FIG. 9 is an elevation view of an interior sidewall surface of an animal litter box according to a fourth alternate embodiment of the invention, including a pattern associated with the interior sidewall surface as a cue.

Referring to FIG. 9, in a fourth alternate embodiment the cue (64) is also comprised of a visually perceptible irregularity associated with the selected portion (66) of the interior sidewall surface (34). More particularly the cue (68) is comprised of a two-dimensional pattern (86) affixed to or formed in the interior sidewall surface (34).

The shape (80) or pattern (86) may be selected to create an illusion of a constriction which will have the same effect as the protrusion (68) of the preferred embodiment. Alternatively the shape (80) or pattern (86) may be comprised of a geometrical shape, image or other indicia which serves either to attract or repel the animal.

Depending upon the effect that the shape (80) or pattern (86) has on the animal, such a cue (64) may be more advantageously associated with the front wall (36), the back wall (38) or the side walls (40,42) so that the cue (64) serves to urge the animal toward the desired orientation.

In other alternate embodiments where the cue (64) comprises a discontinuity, the cue (64) may be comprised of a surface texture associated with the selected portion (66) of the interior sidewall surface (34). In other alternate embodiments where the cue (64) comprises a visually perceptible irregularity, the cue (64) may be comprised of a colour or even a mirror which is associated with the selected portion (66) of the interior sidewall surface (34).

In still other alternate embodiments, the cue (64) may be comprised of something other than a discontinuity or a visually perceptible irregularity. For example, the cue (64) may be comprised of a light, heat or a sensation of warmth associated with the selected portion (66) of the interior sidewall surface (34), a sound associated with the selected portion (66) of the interior sidewall surface (34) or a smell associated with the selected portion (66) of the interior sidewall surface (34).

In the use of the invention, an animal will enter the litter box (20) through the entrance gap (56). Upon entering the litter box (20) the animal will sense the cue (64) and will be urged to act in response to the stimulus provided by the cue (64) by moving toward the desired orientation in the litter box (20).

Where the desired orientation is an orientation in which litter is not thrown toward the entrance gap (56) or urine is not sprayed toward the entrance gap (56), the result will be that the sidewall (24) will contain any litter thrown by the animal and any urine sprayed by the animal.

Where the desired orientation is an orientation in which the animal is urged to position itself over a designated area in the litter box (20), the result will be that the purpose of the designated area will be fulfilled.

The embodiments of the invention in which an exclusive property or privilege is claimed are defined as follows:

1. An animal litter box comprising:
   (a) a floor;
   (b) a sidewall extending upward from the floor, the sidewall surrounding an interior of the litter box, the sidewall having an upper end, a lower end and an interior sidewall surface facing the interior of the litter box, wherein the sidewall is comprised of a front wall and an opposing back wall, wherein the front wall has a length, wherein the back wall has a length, and wherein the length of the back wall is greater than the length of the front wall; and
   (c) a cue associated with a selected portion of the interior sidewall surface, for urging an animal toward a desired orientation in the litter box, wherein the cue is comprised of a discontinuity in the interior sidewall surface, wherein the discontinuity is comprised of a protrusion which extends laterally a protrusion distance toward the interior of the litter box, wherein the protrusion extends vertically from a lower protrusion end to an upper protrusion end and wherein the protrusion distance at the lower protrusion end is less than the protrusion distance at the upper protrusion end.

2. The animal litter box as claimed in claim 1 wherein the protrusion extends vertically from the lower protrusion end above the lower end of the sidewall to the upper protrusion end adjacent to the upper end of the sidewall.

3. The animal litter box as claimed in claim 1 wherein the front wall defines an entrance gap for facilitating ingress to and egress from the litter box by the animal.

4. The litter box as claimed in claim 1 wherein the litter box is further comprised of a rim projecting laterally from the upper end of the sidewall.

5. The litter box as claimed in claim 1 wherein the sidewall is further comprised of a left side wall extending between the front wall and the back wall and wherein the sidewall is further comprised of a right side wall extending between the front wall and the back wall.

6. The litter box as claimed in claim 5 wherein the sidewall is further comprised of a left front corner between the left side wall and the front wall, wherein the sidewall is further comprised of a right front corner between the right side wall and the front wall, and wherein the left front corner and the right front corner are oblique corners.

7. The animal litter box as claimed in claim 1 wherein the back wall is comprised of the selected portion of the interior sidewall surface.

8. The animal litter box as claimed in claim 7 wherein the front wall defines an entrance gap for facilitating ingress to and egress from the litter box by the animal.

9. The litter box as claimed in claim 8 wherein the sidewall has a height and wherein the height of the sidewall is between about nine inches and about twelve inches.

10. The animal litter box as claimed in claim 8 wherein the protrusion extends vertically from the lower protrusion end above the lower end of the sidewall to the upper protrusion end adjacent to the upper end of the sidewall.

11. The litter box as claimed in claim 8 wherein the litter box is further comprised of a rim projecting laterally from the upper end of the sidewall.

12. The litter box as claimed in claim 8 wherein the sidewall is further comprised of a left side wall extending between the front wall and the back wall and wherein the sidewall is further comprised of a right side wall extending between the front wall and the back wall.

13. The litter box as claimed in claim 12 wherein the sidewall is further comprised of a left front corner between the left side wall and the front wall, wherein the sidewall is further comprised of a right front corner between the right side wall and the front wall, and wherein the left front corner and the right front corner are oblique corners.

14. The litter box as claimed in claim 8 wherein the selected portion of the interior sidewall surface is aligned with the entrance gap such that the selected portion of the interior sidewall surface is substantially opposite to the entrance gap.

15. The litter box as claimed in claim 14 wherein the entrance gap extends vertically from a lower gap end above the lower end of the sidewall to the upper end of the sidewall.

16. The animal litter box as claimed in claim 15 wherein the protrusion extends vertically from the lower protrusion end above the lower end of the sidewall to the upper protrusion end adjacent to the upper end of the sidewall.

17. The litter box as claimed in claim 8 wherein the entrance gap extends vertically from a lower gap end above the lower end of the sidewall to the upper end of the sidewall.

18. The litter box as claimed in claim 17 wherein the sidewall has a height and wherein the height of the sidewall is between about nine inches and about twelve inches.

19. The litter box as claimed in claim 17 wherein the sidewall is further comprised of a left side wall extending between the front wall and the back wall and wherein the sidewall is further comprised of a right side wall extending between the front wall and the back wall.

20. The litter box as claimed in claim 19 wherein the sidewall is further comprised of a left front corner between the left side wall and the front wall, wherein the sidewall is further comprised of a right front corner between the right side wall and the front wall, and wherein the left front corner and the right front corner are oblique corners.

21. The litter box as claimed in claim 20 wherein the selected portion of the interior sidewall surface is aligned with the entrance gap such that the selected portion of the interior sidewall surface is substantially opposite to the entrance gap.

22. The animal litter box as claimed in claim 21 wherein the protrusion extends vertically from the lower protrusion end above the lower end of the sidewall to the upper protrusion end adjacent to the upper end of the sidewall.

23. The litter box as claimed in claim 17 wherein the litter box is further comprised of a rim projecting laterally from the upper end of the sidewall.

24. The litter box as claimed in claim 23 wherein the selected portion of the interior sidewall surface is aligned with the entrance gap such that the selected portion of the interior sidewall surface is substantially opposite to the entrance gap.

25. The animal litter box as claimed in claim 24 wherein the protrusion extends vertically from the lower protrusion end above the lower end of the sidewall to the upper protrusion end adjacent to the upper end of the sidewall.

* * * * *